US012209936B2

(12) United States Patent
McCallen et al.

(10) Patent No.: US 12,209,936 B2
(45) Date of Patent: Jan. 28, 2025

(54) SENSOR SYSTEMS AND METHODS OF MEASURING INFRASTRUCTURE DISPLACEMENT

(71) Applicants: Nevada Research & Innovation Corporation, Reno, NV (US); The Regents of the University of California, Oakland, CA (US)

(72) Inventors: David B. McCallen, Reno, NV (US); Patrick Laplace, Reno, NV (US); Floriana Petrone, Reno, NV (US)

(73) Assignees: Nevada Research & Innovation Corporation, Reno, NV (US); The Regents of the University of California, Oakland, CA (US)

(*) Notice: Subject to any disclaimer, the term of this patent is extended or adjusted under 35 U.S.C. 154(b) by 306 days.

(21) Appl. No.: 17/793,019

(22) PCT Filed: Jan. 14, 2021

(86) PCT No.: PCT/US2021/013457
§ 371 (c)(1),
(2) Date: Jul. 14, 2022

(87) PCT Pub. No.: WO2021/146437
PCT Pub. Date: Jul. 22, 2021

(65) Prior Publication Data
US 2023/0052357 A1 Feb. 16, 2023

Related U.S. Application Data

(60) Provisional application No. 63/024,990, filed on May 14, 2020, provisional application No. 62/961,597, filed on Jan. 15, 2020.

(51) Int. Cl.
*G01M 5/00* (2006.01)

(52) U.S. Cl.
CPC ........ *G01M 5/0091* (2013.01); *G01M 5/0066* (2013.01)

(58) Field of Classification Search
CPC .................................................... G01M 5/0091
See application file for complete search history.

(56) References Cited

U.S. PATENT DOCUMENTS

| 4,730,928 A * | 3/1988 | Gabriel | G01M 5/0091 356/400 |
| 8,943,701 B2 * | 2/2015 | Hayes | G01C 15/002 33/1 G |

(Continued)

OTHER PUBLICATIONS

International Search Report and Written Opinion, mailed Apr. 23, 2021, issued for International Patent Application No. PCT/US2021/013457, 13 pages.

(Continued)

*Primary Examiner* — Lee E Rodak
*Assistant Examiner* — Sangkyung Lee
(74) *Attorney, Agent, or Firm* — Klarquist Sparkman, LLP

(57) ABSTRACT

Interstory drift measurement systems and methods of using the same can include a laser beam source configured to emit a beam having at least a first width in a first direction and a sensor system comprising a plurality of diodes spaced apart from one another in the first direction. The plurality of diodes can include a first diode and a diode spacing width in the first direction as measured between a centerline of the first diode and a centerline of an adjacent diode of the plurality of diodes in the first direction. The beam width in the first direction is at least two times the diode spacing width.

21 Claims, 16 Drawing Sheets

(56) References Cited

U.S. PATENT DOCUMENTS

| | | |
|---|---|---|
| 2004/0174542 A1 | 9/2004 | Handman et al. |
| 2017/0307467 A1 | 10/2017 | Coates et al. |
| 2018/0011330 A1* | 1/2018 | Moon ................ H01S 3/005 |
| 2018/0202805 A1 | 7/2018 | Unger et al. |
| 2020/0281510 A1* | 9/2020 | Froehlich ............ G02B 6/4281 |

OTHER PUBLICATIONS

McCallen et al., "A laser-based optical sensor for broad-band measurements of building earthquake drift," *Earthquake Spectra* 33(4): 1573-1598, Nov. 2017.

Petrone et al., "Direct measurement of building transient and residual drift using an optical sensor system," *Engineering Structures* 176: 115-126, Dec. 2018.

Skolnik et al., "Critical assessment of interstory drift measurements," *Journal of Structural Engineering* 136(12): 1574-1584, Dec. 2010.

Trifunac et al., "A note on the useable dynamic range of accelerographs recording translation," *Soil Dynamics and Earthquake Engineering* 21(4): 275-286, Jun. 2001.

Bennett et al., "Interstory drift monitoring in smart buildings using laser crosshair projection," *Optical Engineering* 36(7): 1889-1892, Jul. 1997.

Chen et al., "Laser technique for measuring three-dimensional interstory drift," *Optical and Fiber Optic Sensor Systems*, 3555: 305-310. SPIE, Aug. 1998.

Johnston, "The need for improved instrumentation a petition for an improved instrumentation system for the measurement of building displacements during earthquakes," *Proceedings of the Structural Engineers Association California Convention*, 2003.

McCallen, "A laser-based system for expedient measurement of vibratory motions and permanent deformation in civil infrastructure systems," *Lawrence Livermore National Laboratory Concept Paper*, May 2013.

McCallen et al., "An optical technique for measuring transient and residual interstory drift as seismic structural health monitoring (S 2 HM) observables," *Seismic Structural Health Monitoring*, pp. 263-278. Springer, Cham, 2019.

Rodgers et al., "Seismic response and damage detection analyses of an instrumented steel moment-framed building," *Journal of Structural Engineering* 132(10):1543-1552, Oct. 2006.

* cited by examiner

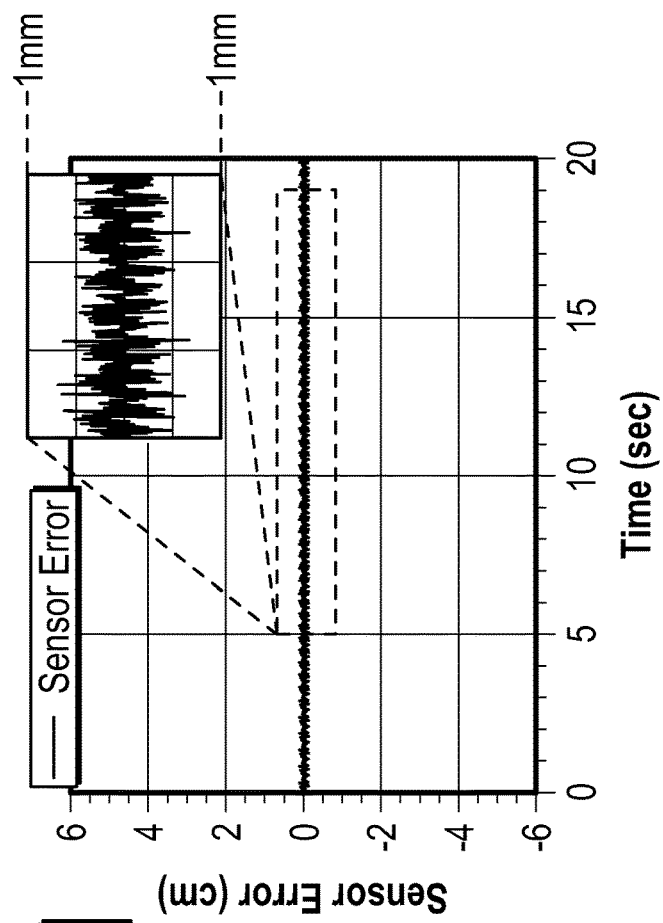
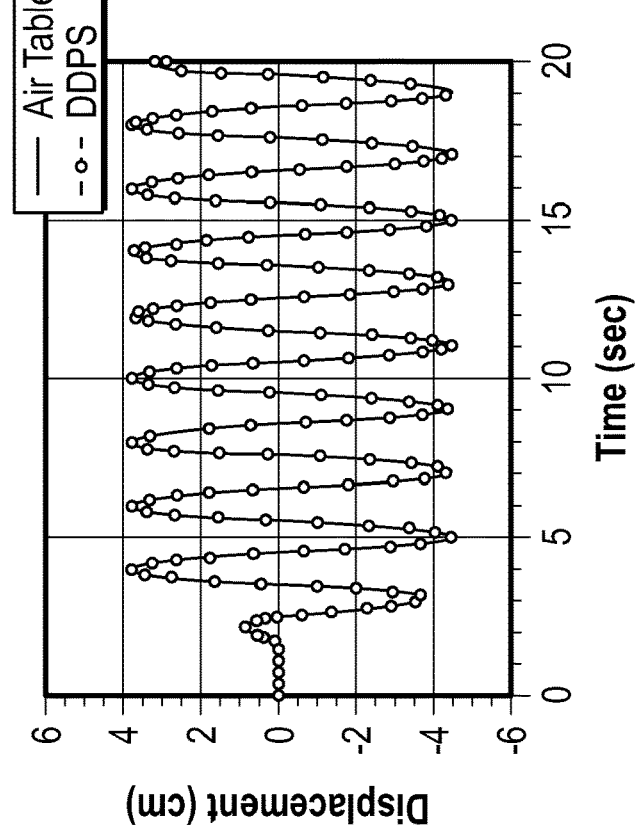
FIG. 8A

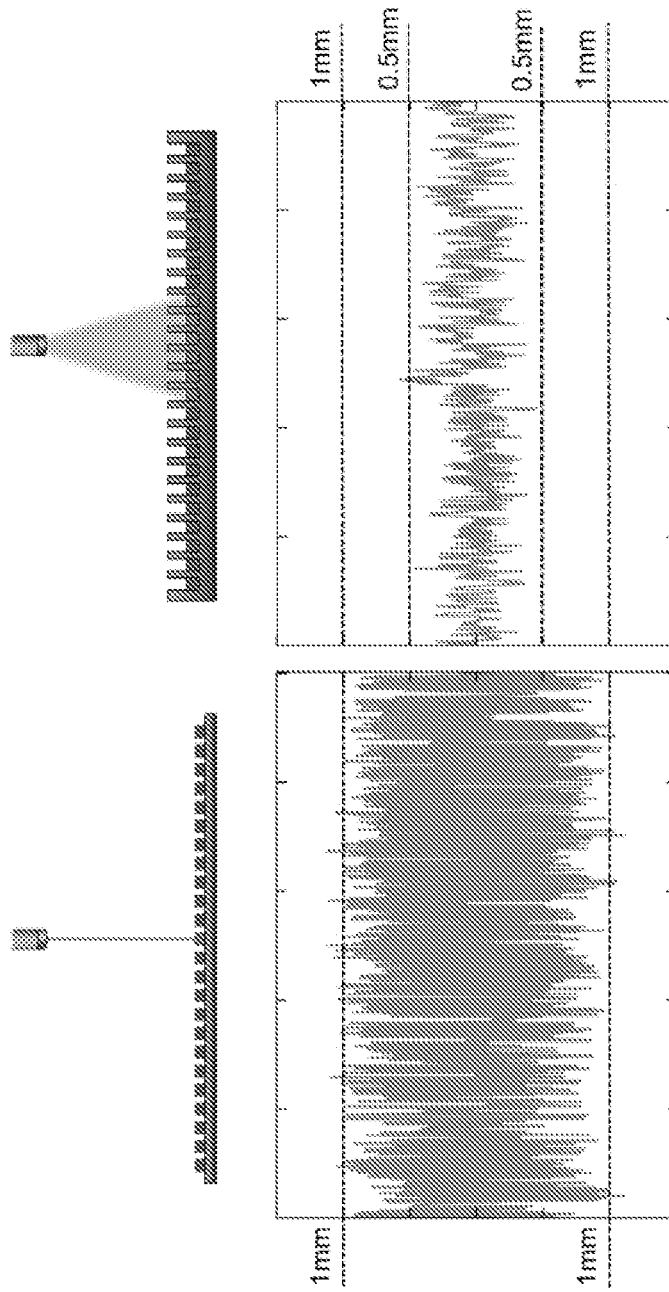

SENSOR SYSTEMS AND METHODS OF MEASURING INFRASTRUCTURE DISPLACEMENT

CROSS REFERENCE TO RELATED APPLICATION

This is the U.S. National Stage of International Application No. PCT/US2021/013457, filed Jan. 15, 2021, which was published in English under PCT Article 21 (2), which in turn claims the benefit of U.S. Provisional Application No. 63/024,990, filed May 14, 2020, and U.S. Provisional Application No. 62/961,597, filed Jan. 15, 2020. The prior applications are incorporated herein by reference in their entirety.

STATEMENT OF GOVERNMENT SUPPORT

This invention was made with government support under Contract No. DE-AC02-05CH11231awarded by the U.S. Department of Energy. The government has certain rights in this invention.

FIELD

This disclosure relates generally to systems and methods for measuring civil infrastructure displacement, such as applications involving infrastructure earthquake response measurement.

BACKGROUND

Building interstory drift is a key earthquake response observable for building structures and is broadly utilized as a response measurement variable in many international engineering codes and standards to define performance-based limit states, maximum allowable story deformations, and quantification of damage in post-earthquake assessments. To date, there has been no widely accepted methodology or technology for reliable and accurate direct measurement of building drift. Improvements in systems and methods for measuring civil infrastructure displacement, such as that caused by earthquakes, are desirable.

SUMMARY

Disclosed herein are various embodiments of sensor systems for measuring civil infrastructure displacement.

In one embodiment, an interstory drift measurement system is provided. The system includes a laser beam source configured to emit a beam having a first width in a first direction and a sensor system comprising a plurality of diodes spaced apart from one another in the first direction. The plurality of diodes include a first diode and a diode spacing width in the first direction as measured between a centerline of the first diode and a centerline of an adjacent diode of the plurality of diodes in the first direction. The beam width in the first direction is at least two times the diode spacing width.

In some embodiments, the laser beam source is configured to emit the beam with a second width in a second direction to measure biaxial displacement. The sensor system comprises a plurality of diodes spaced apart from one another in the second direction. The plurality of diodes include a second diode and have a diode spacing width in the second direction as measured between a centerline of the second diode and a centerline of an adjacent diode in the second direction of the plurality of diodes. The beam width in the second direction is at least two times the diode spacing width in the second direction.

In other embodiments, methods of measuring interstory drift are provided. In one such embodiment, the method comprises emitting a beam from a laser beam source at a first location so that at least a portion of the beam impinges on a plurality of diodes of a sensor system at a second location, measuring an electrical response (e.g., a voltage and/or induced current) at respective diodes of the plurality of diodes upon which the beam impinges, receiving the measured electrical responses from the diode array over a period of time, calculating a centroid of the beam based on the received electrical responses from the plurality of diodes, and determining an amount of interstory drift over the period of time based on the calculated centroid of the beam.

The foregoing and other objects, features, and advantages of the invention will become more apparent from the following detailed description, which proceeds with reference to the accompanying figures.

BRIEF DESCRIPTION OF THE DRAWINGS

FIGS. 8A-8C show exemplary DDPS displacement measurements and measurement errors for selected applied sinusoidal displacement histories of 0.5 Hz (FIG. 8A), 2.0 Hz (FIG. 8B) and 5.0 Hz (FIG. 8C).

FIGS. 10A-10B compare the accuracy of an exemplary diffuse laser beam system that impinges on a plurality of diodes as disclosed herein with a focused laser beam system that impinges on a single diode.

DETAILED DESCRIPTION

Figure 1:
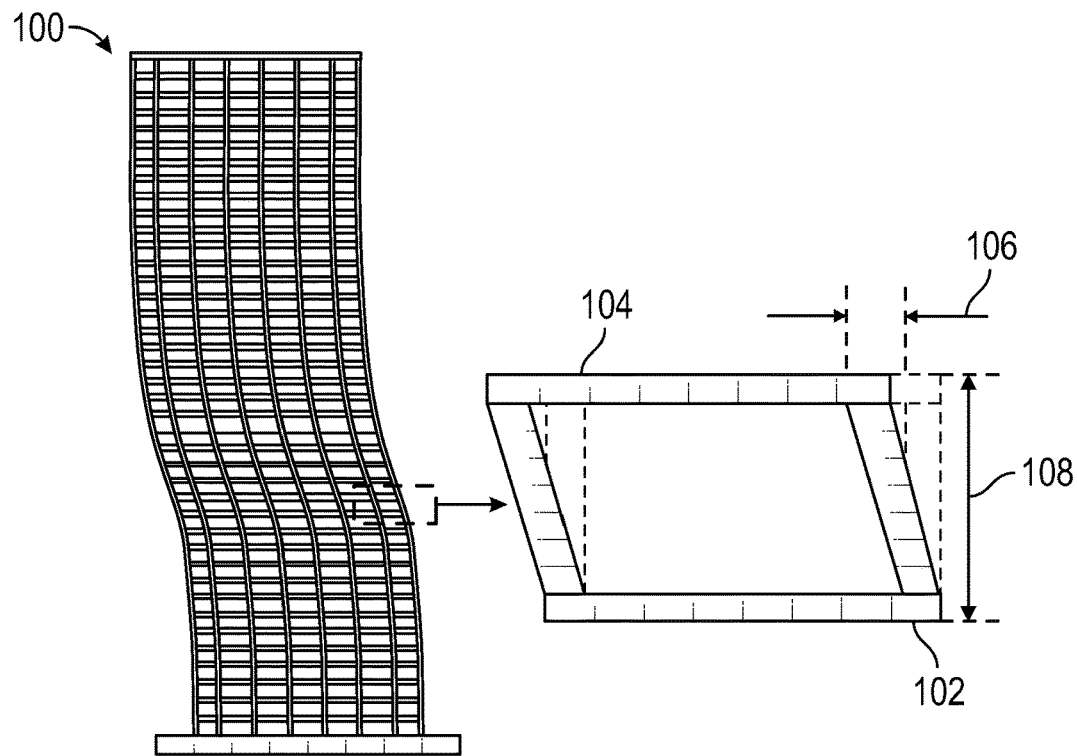
FIG. 1 illustrates building drift including residual drift due to inelastic response.

The detailed description herein describes certain exemplary embodiments relating to sensor systems for measuring interstory drift.

General Considerations

The present disclosure relates to sensor systems for measuring interstory drift and methods of using the same. It should be understood that although the various embodiments described herein disclose particular methods or materials applied in specific implementations, in view of these teachings' other methods, materials, and implementations that are similar or equivalent to those described herein may be possible. As such, the following description is exemplary in nature and is not intended to limit the scope, applicability, or configuration of the disclosure in any way. Various changes to the described embodiments may be made, such as in the function and arrangement of the elements described herein, without departing from the scope of the disclosure.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As noted above, the systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

Interstory Drift Measurement Systems

The ability to rapidly respond and execute appropriate post-earthquake mitigation measures is an important component of society's overall earthquake resilience and can provide major benefits to both human safety and economic recovery. The ability of infrastructure stakeholders and emergency responders to make key decisions and take appropriate actions in a post-earthquake environment can be greatly assisted by the rapid distribution of actionable data obtained from earthquake monitoring systems. Observables that have traditionally informed the understanding of the damage potential for a particular earthquake event have included both measurements of ground motions, which yield information on the effective forcing function, and measurements of infrastructure response which provide information on earthquake demands for a particular structure. Historically, strong motion accelerometers have been employed to measure both ground motions and structural response, with the limitation that in the case of structural response the accelerometer data must be appropriately processed after an earthquake event to remove drift, instrument noise etc.

A response observable of high interest to the engineering community is a building's interstory drift, measured by the relative displacement between two successive floors of a building as shown in FIG. 1. In particular, FIG. 1 illustrates an enlarged view of a consecutive floors of a building 100, including a first floor 102 and second floor 104. Second floor 104 is a successive floor that is directly above the first floor 102. An interstory drift ratio is defined as the amount of interstory drift ($\Delta$) 106 dived by a story height (h) 108.

Figure 2:
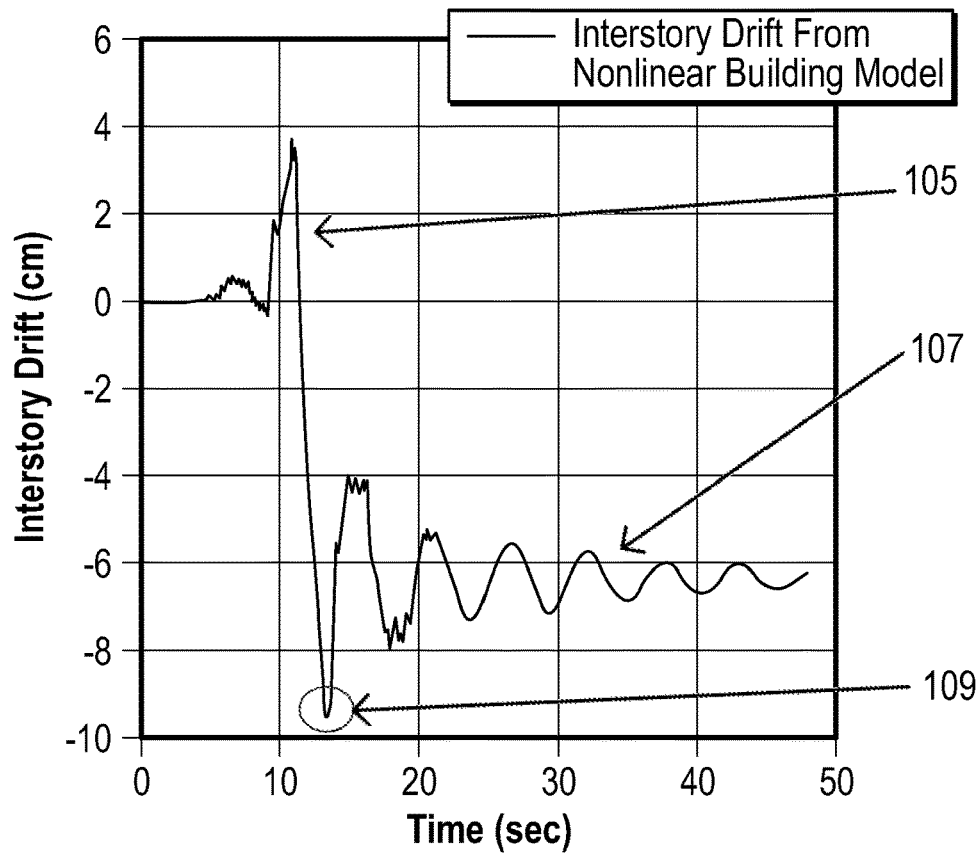
FIG. 2 shows a representative drift history from a non-linear building model subjected to strong near-fault motions.

A chart showing Interstory Drift (cm) over time is shown in FIG. 2, where Transient Interstory Drift (TID(t)) 105—the full time-varying drift waveform, Peak Interstory Drift (PID) 109—the largest magnitude drift observed and Residual Interstory Drift (RID) 107—the permanent drift due to inelastic action are shown.

Given that structural member stresses are the result of displacement driven deformations in the structural system, displacement drift provides a direct measure of induced stresses and demand on the structure. Many building design and damage inspection standards utilize interstory drift as a key response variable to quantify building limit states, not-to-exceed drifts, and define damage indexes with specific examples provided in Table 1 below.

TABLE 1

| Standard | Specification |
| --- | --- |
| U.S. American Society of Civil Engineers Seismic design criteria for structures, systems and components in nuclear facilities (ASCE 43-05) | Definition of structure limit states defined in terms of PID levels |
| Eurocode (EN1998-1) New Zealand Standard (NZS -1170.5) U.S. Pacific Earthquake Engineering Research Center Guidelines for Performance-Based Seismic Design of Tall Buildings (TBI 2.03) | Definition of system maximum allowable interstory drift in terms of PID |
| U.S. Federal Emergency Management Agency Seismic Performance Assessment of Buildings (FEMA P58-1) | Definition of system damage states in terms of RID |

Building floor acceleration measurements obtained from deployed accelerometers can be used to compute story drifts through a process of double integration to obtain approximations of floor displacements and subsequent differencing of the computed floor displacements to obtain story drift displacement. However, this is a challenging process owing to the impacts of accelerometer data processing and the frequency band-limited characteristics of accelerometers and becomes very problematic when inelastic response results in permanent story drifts. Because interstory displacements are the principal cause of member stresses, it can be more desirable to directly measuring structural displacements as opposed to structural accelerations for evaluation of building earthquake demands and potential damage.

Figure 3:
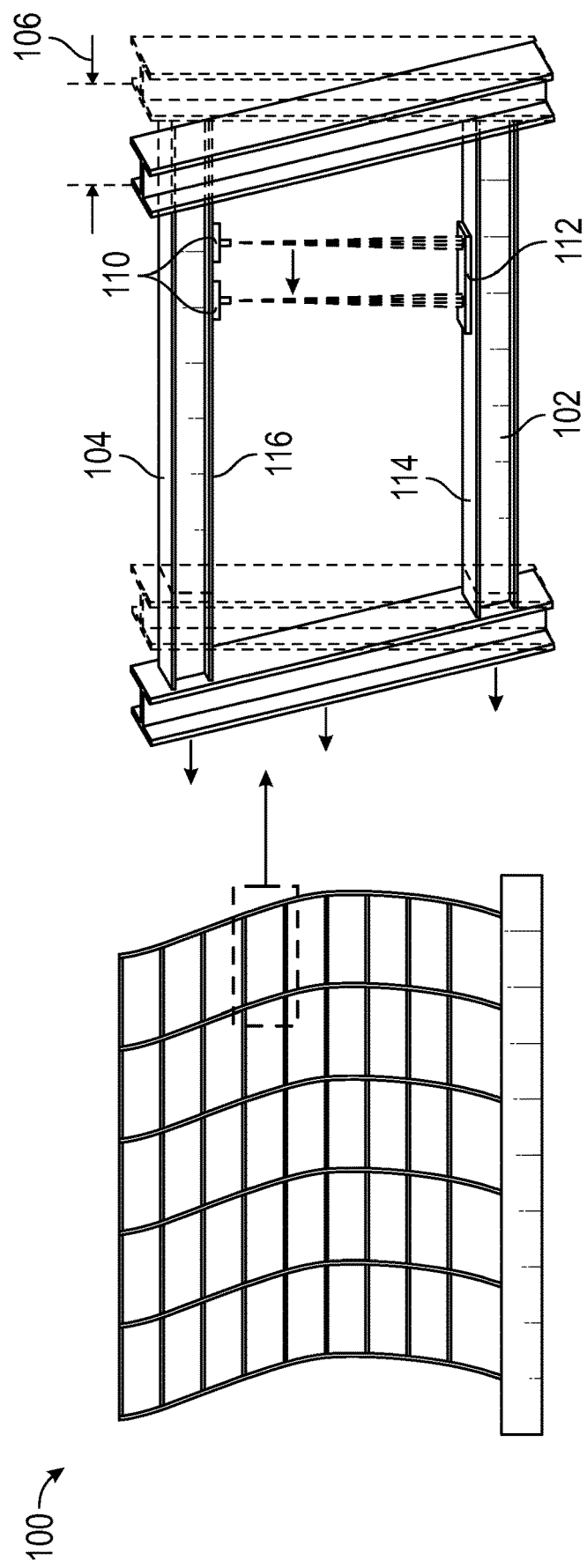
FIG. 3 illustrates the direct measurement of interstory drift with a laser-based optical system, with the laser beam impinging on a sensor.

The measurement principal of the system shown in FIG. 3 includes the instantaneous tracking of the position of a laser 110 propagating across a story height (h) with the position of the laser measured by a light sensitive sensor termed a Discrete Diode Position Sensor (DDPS) 112. This system directly measures the time history of interstory drift and, due to the ability to measure both dynamic and static displacements, can accurately measure both transient interstory displacements (e.g., peak lateral displacement) (TID) and residual interstory displacement (e.g., permanent lateral displacements) (RID).

As shown in FIG. 3, the DDPS 112 can be positioned on an upper surface 114 of the first floor 102, and the laser 110 can be positioned on a lower surface 116 of the second floor 104. In this manner, the laser 110 is directed toward the DDPS 112. In some embodiments, the arrangement can be reversed. Accordingly, as used herein, the terms "first floor" and "second floor" refer to adjacent floors and do not require the first floor to be below the second floor (as shown in FIG. 3), although in some embodiments that may be the case.

As described herein, novel modifications of conventional measurement systems have resulted in important practical improvements, for example the ability to use a very low-power, eye safe laser and accuracy improvements that expand the range of applicability of the DDPS system to measure small-amplitude ambient vibrations as well as large earthquake induced building motions. As a result of fundamental improvements in the manner in which the sensor interacts with optical diodes, the systems and methods disclosed herein significantly improve the dynamic displacement range. For example, in some embodiment, the systems and methods disclosed herein can measure drift displacements as small as ~1 mm and as large as 10 cm or more as necessary for a particular application.

Figure 4:
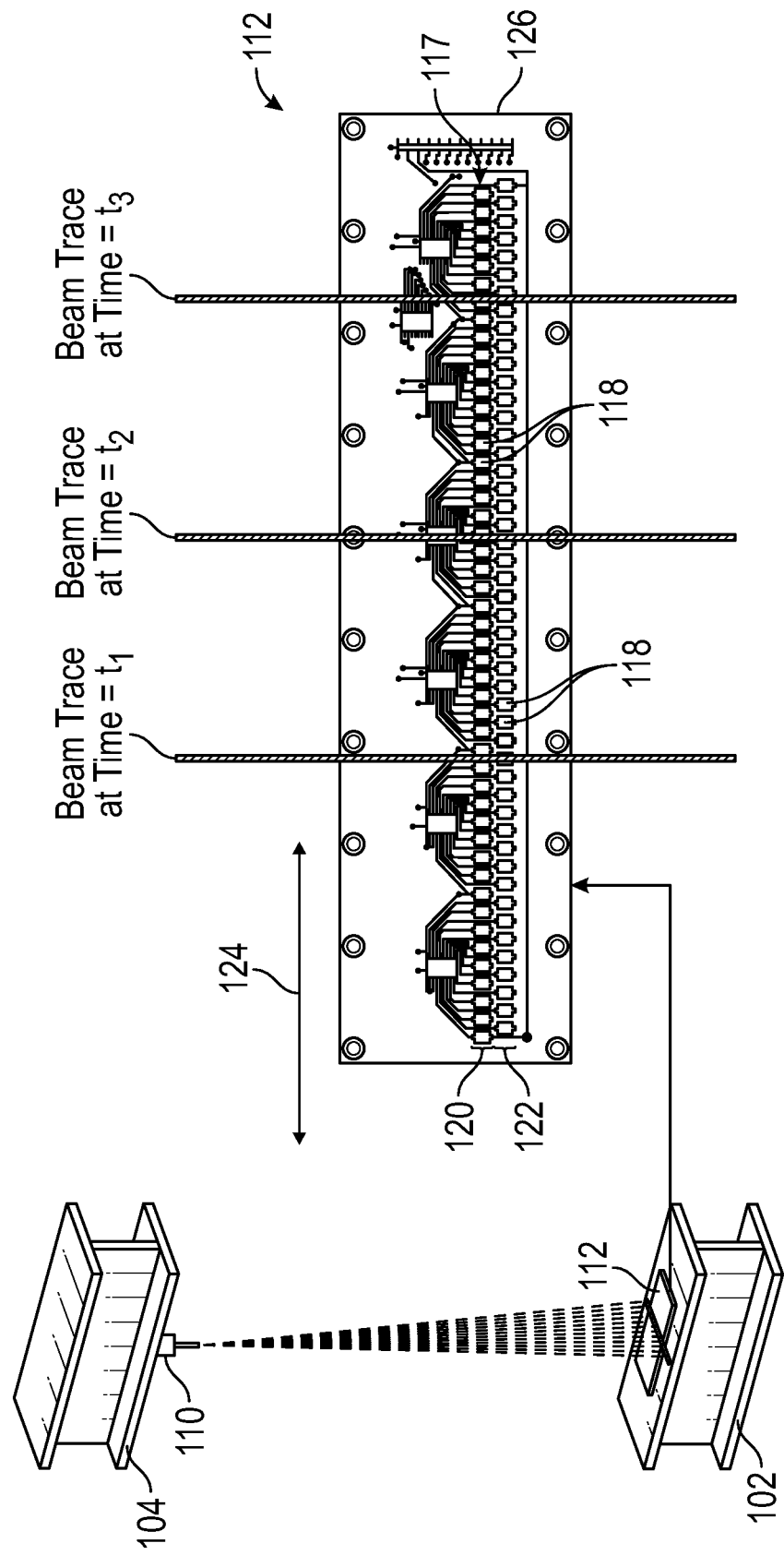
FIG. 4 illustrates a diffracted laser beam from a low power, small laser trace impinging on an exemplary DDPS diode array.

The DDPS measures the precise temporal location of an incident laser beam which has been diffracted through a lens to create a line source as indicated in FIG. 4. The diffracted beam is generated with sufficient width transverse to the sensor to prevent the laser from moving off the sensor when orthogonal displacements occur in the structure. The DDPS can comprise a diode array 117, such as staggered grid of a plurality of optical diodes 118, which register an electrical response (e.g., a voltage and/or induced current) when hit by laser light, to sense the current location of the impinging laser beam. The staggered grid of the plurality of optical diodes 118 can include, for example, a plurality of rows of optical diodes. FIG. 4 illustrates two rows of optical diodes, first row 120 and second row 122; however, it should be understood that more than two rows can be provided (e.g., 2 to 5 rows, 2 to 4 rows, 2 to 3 rows, or in some embodiments 2 to 10 rows). If more than two rows are provided, in some embodiments, some diodes in certain rows may be aligned with other diodes in other rows of the plurality of rows.

FIG. 4 illustrates a direction 124 of drift measurement (e.g., a direction of lateral drift displacement), and shows an exemplary beam trace of the laser 110 over a duration or time of the displacement (e.g., $t_1$, $t_2$, $t_3$).

By very rapidly sampling the electrical response (e.g., a voltage and/or induced current) in all diodes in the array, the transient location of the incident laser beam is determined by identification of the diodes that are registering an electrical response at each instant of time (FIG. 4). In some embodiments, the DDPS 112 can comprise a fully integrated sensor on a single circuit board 126. In addition, as discussed in more detail below, the system can include an enhanced capability integrated sensor/communication system with a small footprint.

Conditioning of Laser Beam

A measurement system can utilize a tightly focused laser beam to provide a thin, sharp profile in the direction of measurement, i.e. creating a thin line source. However, by making the laser line more defuse—essentially defocusing the laser beam to have a broader "blurred" footprint that engages more diodes, higher accuracy drift measurements can be provided. An embodiment utilizing a diffuse beam 128 with the DDPS is illustrated in FIG. 5.

In some embodiments, the beam can be conditioned to impinge, at any given time/position, on at least two diodes 118 in the diode array, or on at least three diodes of the diode array, or on at least four diodes in the diode array, or on at least five diodes in the diode array. In some embodiments, the beam can be conditioned to impinge on between 2 and 15 diodes, between 2 and 10 diodes, between 2 and 8, or between 3 and 7 diodes in the diode array at any given time/position.

Figure 5:
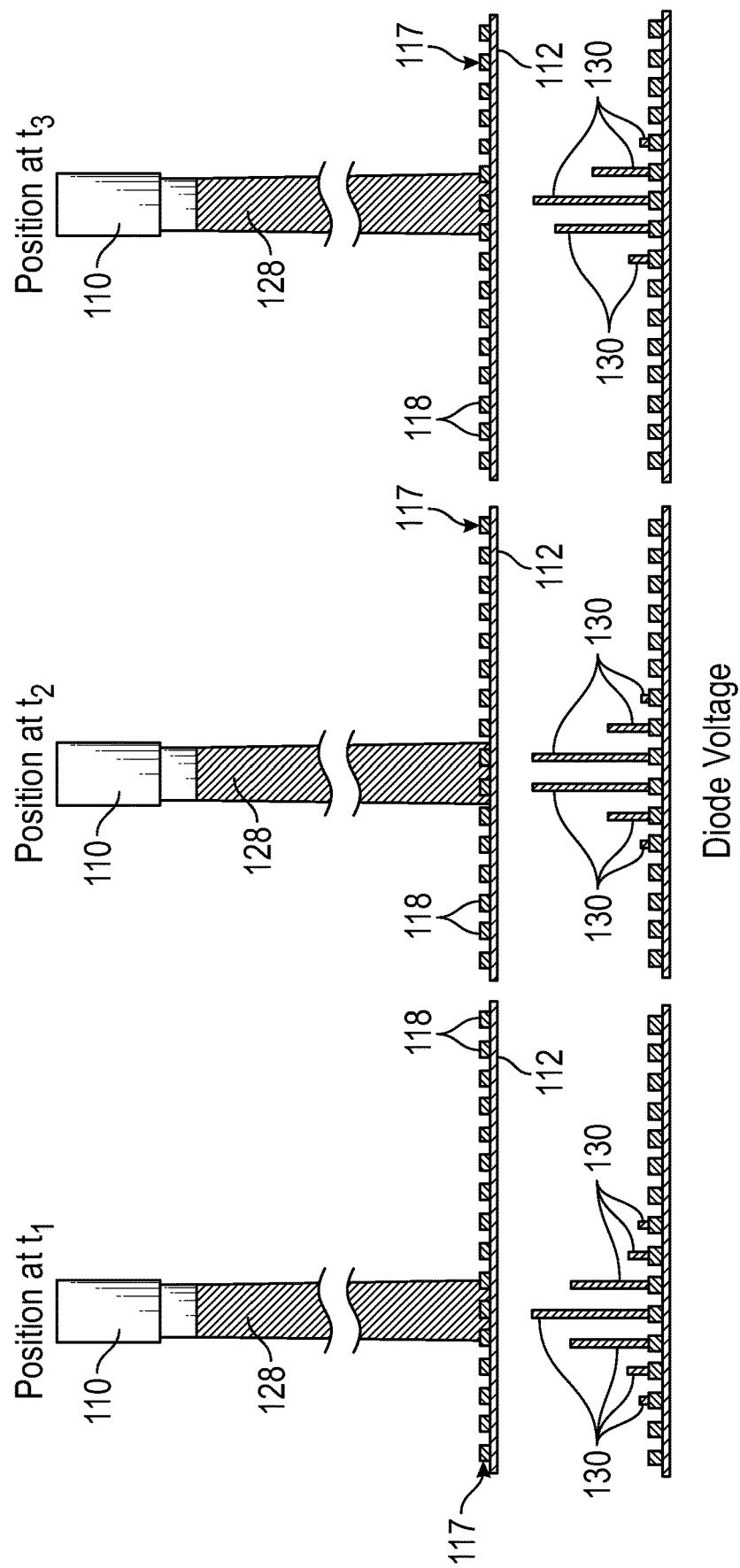
FIG. 5 illustrates the conditioning of an exemplary incident laser beam to have a diffuse beam.

FIG. 5 illustrates a laser 110 that emits a diffuse beam 128 that impinges on a diode array 117 of the DDPS 112. As shown in FIG. 5, the beam 128 can be configured to impinge on a plurality of diodes 118 at any given time during a measurement. In some embodiments, the number of diodes 118 impinged upon may depend upon the precise location of the beam 128. For example, at a first time (t1), the beam 128 can generate a voltage 130 by its interaction with seven diodes, at a second time (t2), the beam 128 can generate a voltage 130 by its interaction with six diodes, and at a third time (t3), the beam 128 can generate a voltage 130 by its interaction with five diodes. Thus, in this exemplary system, the beam can at any given time of a measurement be configured to impinge on five to seven diodes.

Figure 6:
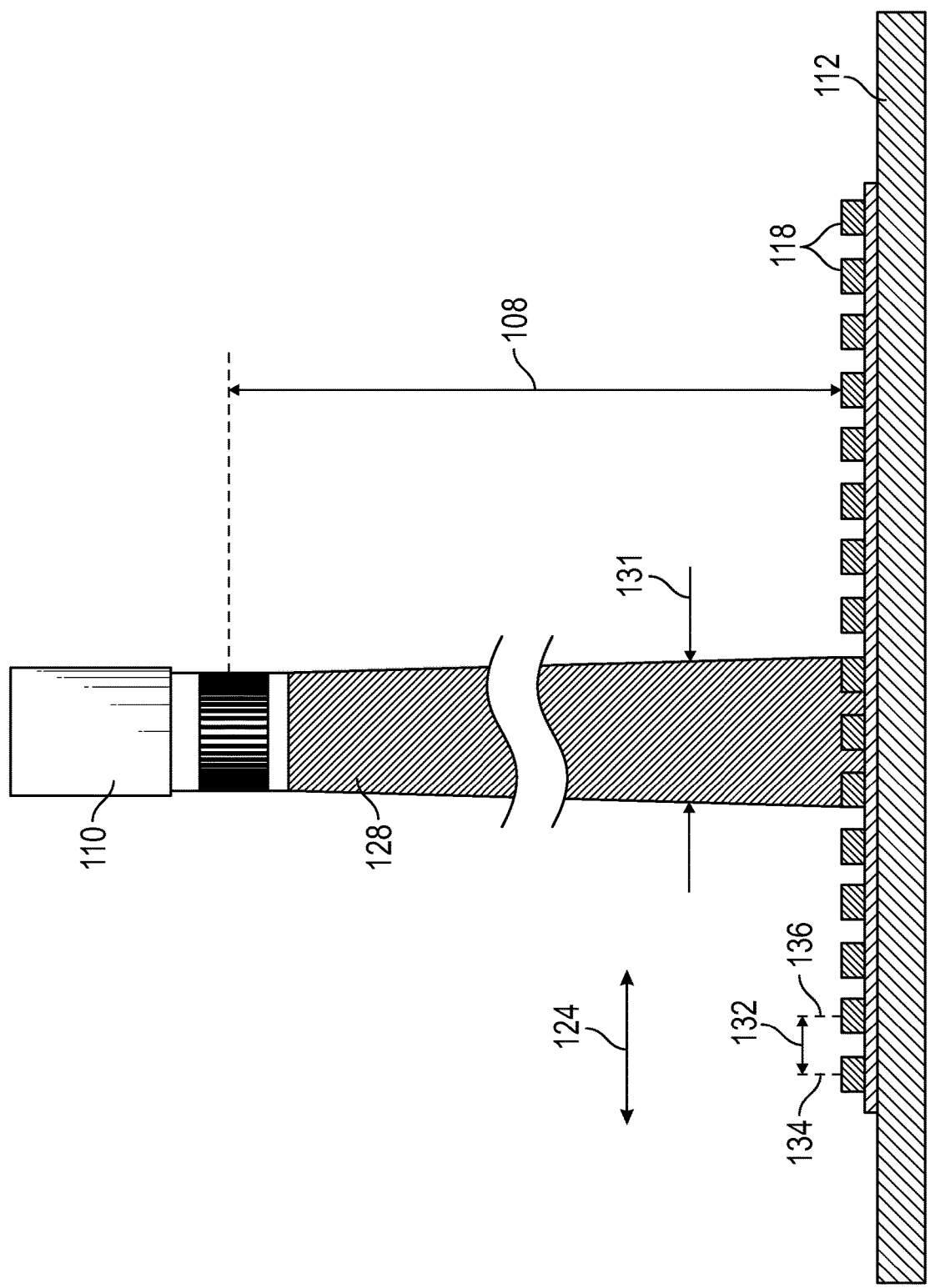
FIG. 6 illustrates the conditioning of another exemplary incident laser beam to have a diffuse beam.

FIG. 6 illustrates another exemplary system in which a beam width (Wb) 131 is greater that the diode spacing (Ds) 132 along a first direction 124 (e.g., the x or y directions, or both, depending on whether the system is a uniaxial system or biaxial system as discussed below). In one embodiment, the beam width can be from 2 to 15 times the diode spacing, from 2 to 10 times, from 2 to 8 times, or 2 to 5 times the diode spacing along a first direction. Diode spacing as used herein refers to the spacing between diodes in one direction, which may include diodes in different rows if a staggered configuration is provided. Thus, for example, if the two closest diodes along a first direction are a first diode in a first row and a second diode in a second, adjacent row, then the diode spacing is the linear difference between a center line of the first diode 134 and a center line of the second diode 136. In the exemplary embodiment shown in FIG. 6, at the given time, the beam 128 impinges on three diodes 118 along the first direction 124.

Figure 7:
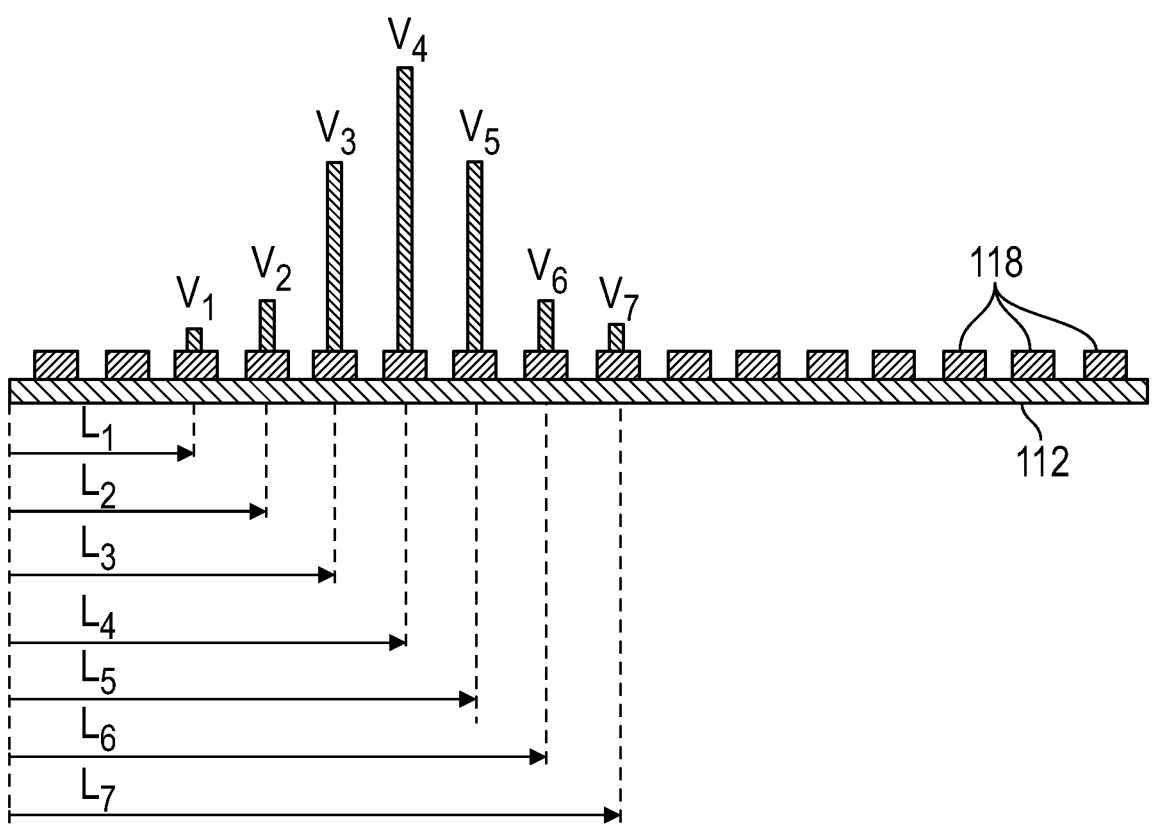
FIG. 7 illustrates an exemplary diode array with an incident diffuse laser beam.

As shown in FIG. 7, the voltages (e.g., $V_1$, $V_2$, $V_3$, $V_4$, $V_5$, $V_6$, $V_7$ when the beam impinges on seven spaced-apart diodes) generated by the impinging laser beam across each diode can be calculated, with the relative distances between each diode being known (e.g., from lengths $L_1$-$L_7$). With this approach the centroid of the laser light can be calculated, for example, by using the equation below, from the voltage profile to provide a better determination of the laser location.

$$\text{Beam Centroid} = \frac{(V_1 \times L_1) + (V_2 \times L_2) + (V_3 \times L_3) + (V_4 \times L_4) + (V_5 \times L_5) + (V_6 \times L_6) + (V_7 \times L_7)}{V_1 + V_2 + V_3 + V_4 + V_5 + V_6 + V_7}$$

$$= \frac{\sum(V_i + L_i)}{\sum(V_i)}$$

The systems and methods disclosed herein can achieve a significant reduction in measurement error. In addition, these systems and methods can also provide a more robust sensor by reducing the sensitivity to individual diode manufacture and fabrication variability, such as imprecise placement and location of the diode or the small diode-to-diode variability in a light sensitive surface area (e.g., the surface area of the diode array).

Figure 8B:
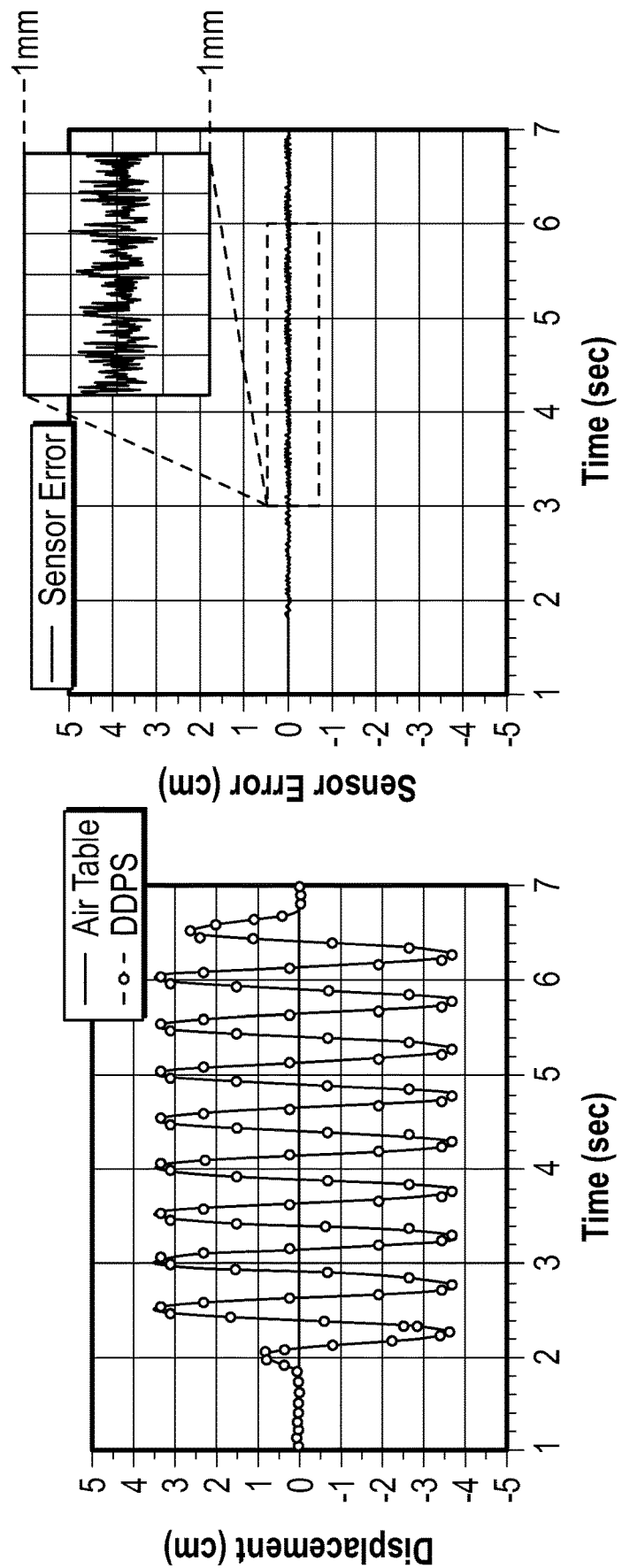
Figure 8C:
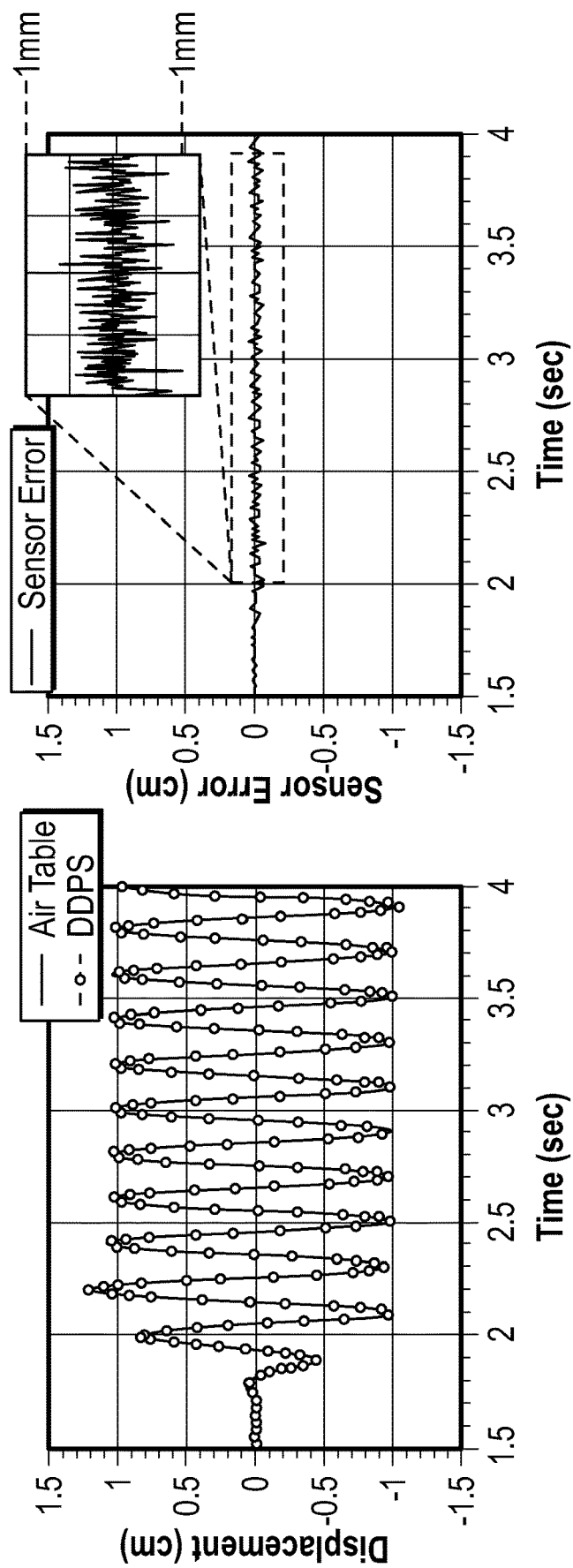

A test bench was constructed using a precision-controlled air table that can be programmed to produce prescribed motions. To assess the displacement measurement performance a laser was positioned at a distance from an optical sensor supported on the air table, and the sensor was subjected to sinusoidal motions at a selected range of frequencies including 0.2, 0.5, 1.0, 5.0 and 10 Hz. The prescribed displacement of the air table, taken as measurement ground truth due to the high accuracy of the controlled displacements, were compared to the DDPS measurement of transient displacement at each frequency and selected comparisons are shown in FIG. 8A-C.

Across all frequencies tested, the DDPS displacement measurement was in excellent agreement with the imposed motion of the air table and the error in the DDPS displacement values were on the order of 0.5 mm or less across the full range of frequencies.

Figure 9A:
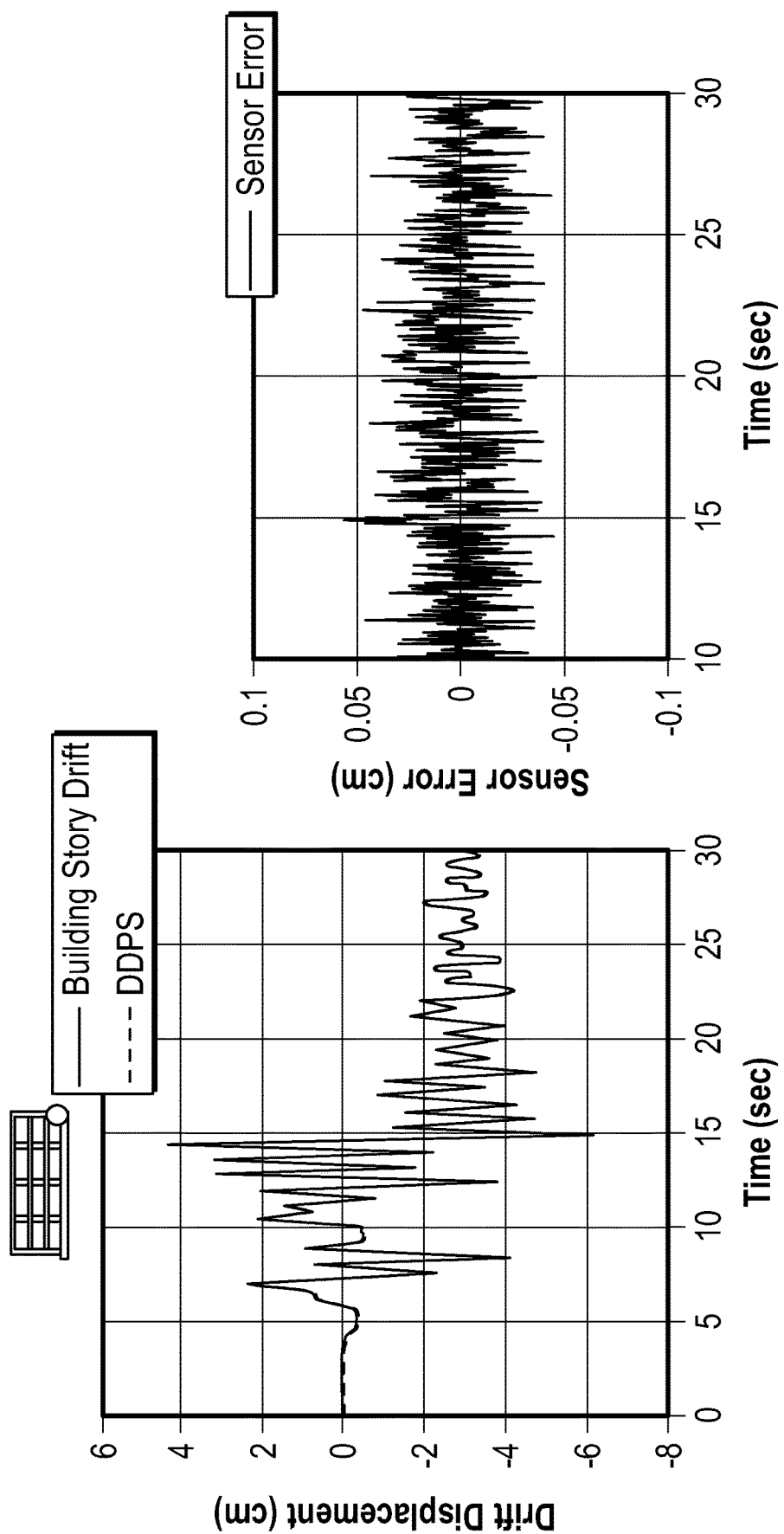
FIGS. 9A-9B show exemplary DDPS displacement measurements and measurement errors for representative earthquake induced building drifts.
Figure 9B:
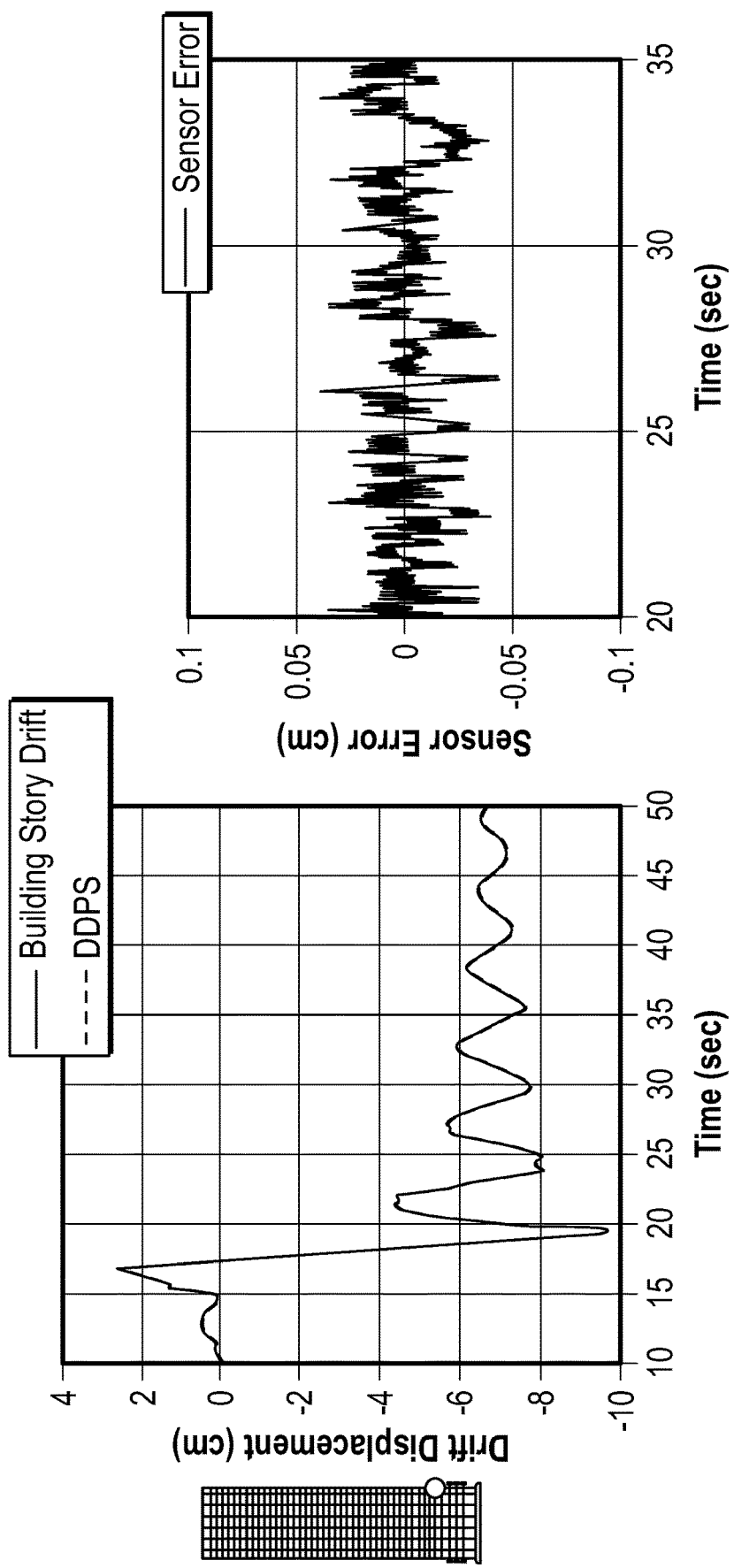

In addition to the sinusoidal test motions, the system was tested for representative building interstory drifts. For this set of tests two representative building drifts were previously developed as part of a DDPS testing protocol. The drifts were developed from nonlinear finite element models of steel moment frame buildings subjected to strong near-fault earthquake motions. To span a range of building types, one drift was generated for a three-story steel frame building subjected to near-fault records from the Izmit Turkey earthquake, and one drift was generated for a forty-story steel frame building subjected to the Landers Calif. earthquake (with the record corrected to include near-fault ground displacements). In both cases the buildings experienced large drifts and inelastic response leading to significant residual drifts in the building. The drift displacement measured by the DDPS for each building is compared to the air table-imposed drifts shown in FIGS. 9A and 9B. As with the case of the sinusoidal motions, the DDPS measured motions exhibited excellent agreement with the imposed story drifts, including the ability to measure permanent drifts, and the amplitude of the measurement error was approximately 0.5 mm for both buildings.

Accordingly, the system can comprise a laser beam that enhances the manner in which the laser interacts with the individual diodes in a diode grid array, resulting in a reduction in the sensor displacement measurement error, in some embodiments, by a factor of 2. This error reduction results in drift displacement measurements with an accuracy of +/−0.5 mm and increases the ability of the DDPS to measure environmental vibrations of building structures due to wind or other low-amplitude excitations. This increases the sensor application space to include system identification and structural change detection from small amplitude environmental vibrations, and the new approach also readily enables the extension of the current uniaxial drift sensor to a biaxial sensor for multi-direction drift measurements.

In addition to increasing the accuracy of the system, this laser beam configuration can provide a more robust measurement that is less sensitive to minor geometry misalignments in the DDPS components. This relaxes the precision of the DDPS component fabrication and assembly and provides redundancy against any diode failures. The enhanced laser beam configuration also provides a means to readily extend the previous uniaxial sensor (measuring drift in one direction) to a biaxial sensor that can simultaneously measure drift in two directions. With the increase in accuracy, the sensor will be more capable of measuring low amplitude ambient vibrations that occur frequently due to wind and other ambient excitation sources, allowing for system identification of specific structures.

FIGS. 10A and 10B provide a comparison of the accuracy of an exemplary diffuse laser beam system that impinges on a plurality of diodes as disclosed herein (FIG. 10B) with a focused laser beam system (FIG. 10A) that impinges on a single diode. As shown in FIG. 10B, the diffuse laser beam system provides an accuracy of within less than about 0.5 mm, which is a significant improvement over the focused laser beam system shown in FIG. 10A.

Figure 11:
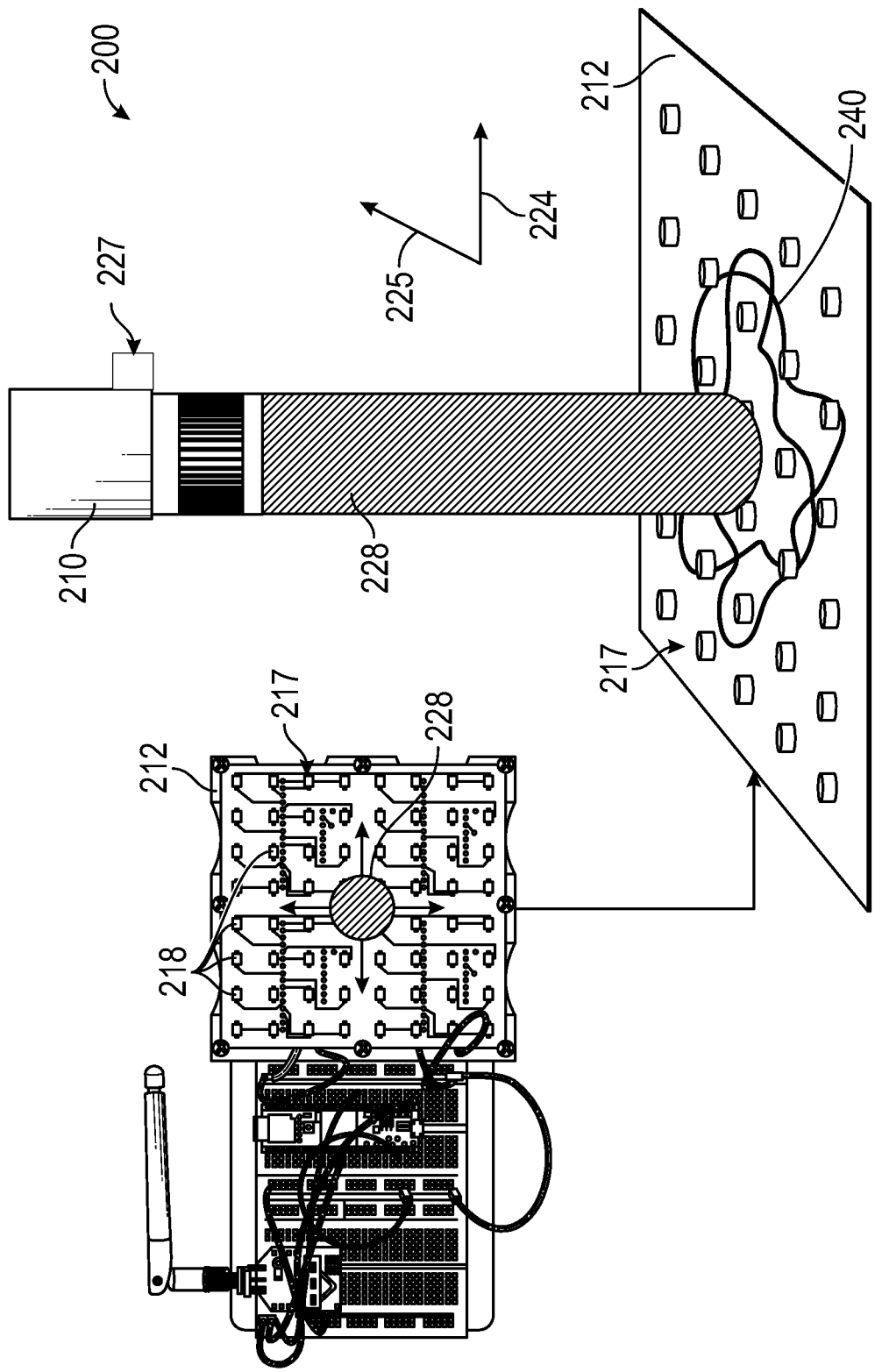
FIG. 11 illustrates an exemplary sensor system with a diffuse laser beam configured to measure biaxial displacement.

FIG. 11 illustrates an exemplary sensor system 200 with a biaxial sensor 212 that can simultaneously measure drift in two directions (e.g., x- and y-directions). The system can fundamentally operate in the same manner as the uniaxial sensor, but comprises additional sensors (e.g., diodes 218) along a second direction 225. For example, as shown in FIG. 11, the second direction 225 can include the same number of diodes in the diode array as the first direction 224 (e.g., from 5 to 20 diodes in each direction, from 5 to 15 diodes in each direction, or from 5 to 10 diodes in each direction). Thus, as the reference floor (e.g., the second floor with the laser 210) is displaced relative to the other floor (e.g., the first floor with the sensor 212), the beam 228 can be tracked as it moves across a displacement path 240.

As shown in FIG. 11, a plurality of diodes 218 can be provided on a plurality of rows and columns. For example, the diode array 217 shown in FIG. 11 comprises eight rows of diodes 218 of eight diodes (e.g., eight columns of diodes 218). The diodes 218 of the diode array 217 shown in FIG. 11 are not staggered in adjacent rows; however, if desired, they could be staggered as shown in previous embodiments. Although this embodiment illustrates an 8 by 8 grid array, it should be understood that any number of rows and/or columns can be provided. For example, in some embodiments, the grid array can comprise 4-20 rows and 4-20 columns. In other embodiments, the grid array can comprise 6-20 rows and 6-20 columns. In addition, in some embodiments, the number of rows can be equal to the number of columns (or the number of diodes in a first direction can be equal to a number of diodes in the second direction); alternatively, the number of diodes in rows and columns can be different.

In some embodiments, one or more rotational sensors can be provided to detect and correct for rotation of the laser. For example, as shown in FIG. 11, an inertial measurement unit (IMU) 227 can be mounted to the laser and/or the laser mounting system to detect rotation of the laser and/or laser mounting system. The IMU can comprise any suitable sensor that can detect and quantify rotation of the laser system, such as a microelectromechanical system (MEMS) gyroscope sensor. The sensor can be mounted to the laser and/or laser mounting system in any suitable manner.

Sensor Diode Placement

Figure 12:
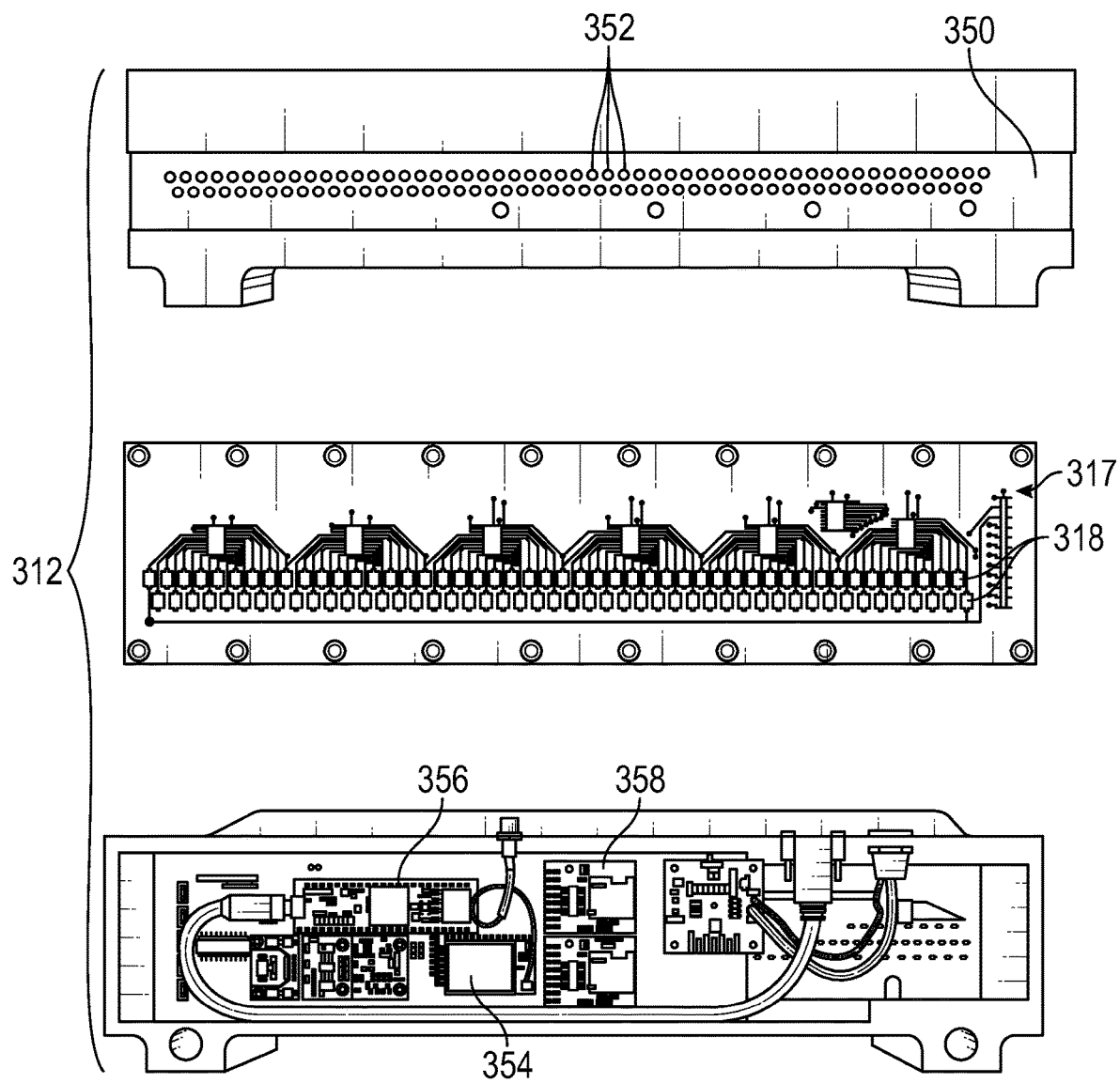
FIG. 12 illustrates an exemplary sensor system with a sensor cover that includes recessed diode holes.

The systems and methods disclosed herein provide a controlled light environment that advantageously allows the use of a much lower power, eye-safe laser. This can reduce and/or eliminate many operational safety considerations. In one embodiment, this is further achieved by providing a sensor system 312 that has sensor diodes 318 positioned at a depth relative to a sensor cover 350. For example, the diodes 318 can be recessed relative to openings 352 in the sensor cover 350 (which resemble a natural honeycomb structure when a staggered configuration is used). FIG. 12 illustrates sensor cover 350 with diodes 318 recessed in openings 352. The sensor system 312 can be of a stacked configuration, with cover 350 provided over the grid array 317, which is in turn provided over additional operational components of the sensor 350 (e.g., a RF communication node 354, a microprocessor 356, and one or more storage devices 358). FIG. 10B also illustrates a plurality of diodes recessed relative to a top surface of a sensor system.

By providing an enhanced design for reducing the incident light on the diodes, through placement of the diodes in recessed holes in the DDPS housing, the DDPS design allows the use of very low-power lasers. In some embodiments, the laser can be of the same or similar power to that of a typical laser pointer (e.g., having an output beam power of less than 5 mW). This is an important practical enhancement in that it removes the eye safety issues that existed with previously used higher power lasers and can also result in significant hardware cost savings.

Distributed Network of Sensors

FIG. 12 also illustrates an embodiment that includes a wireless communication node 354 on-board of a sensor system 312. By providing a wireless communication node the system can transmit measurement data to any desired source.

In some embodiments, a distributed network of sensors can be provided in a building 300 to form a self-configuring, self-healing network for agile and efficient deployment and data transmission and collection. The RF communication node 354 can comprise a suitable communication device, such as a commercially available device operating in the 900 MHz band.

Figure 13:
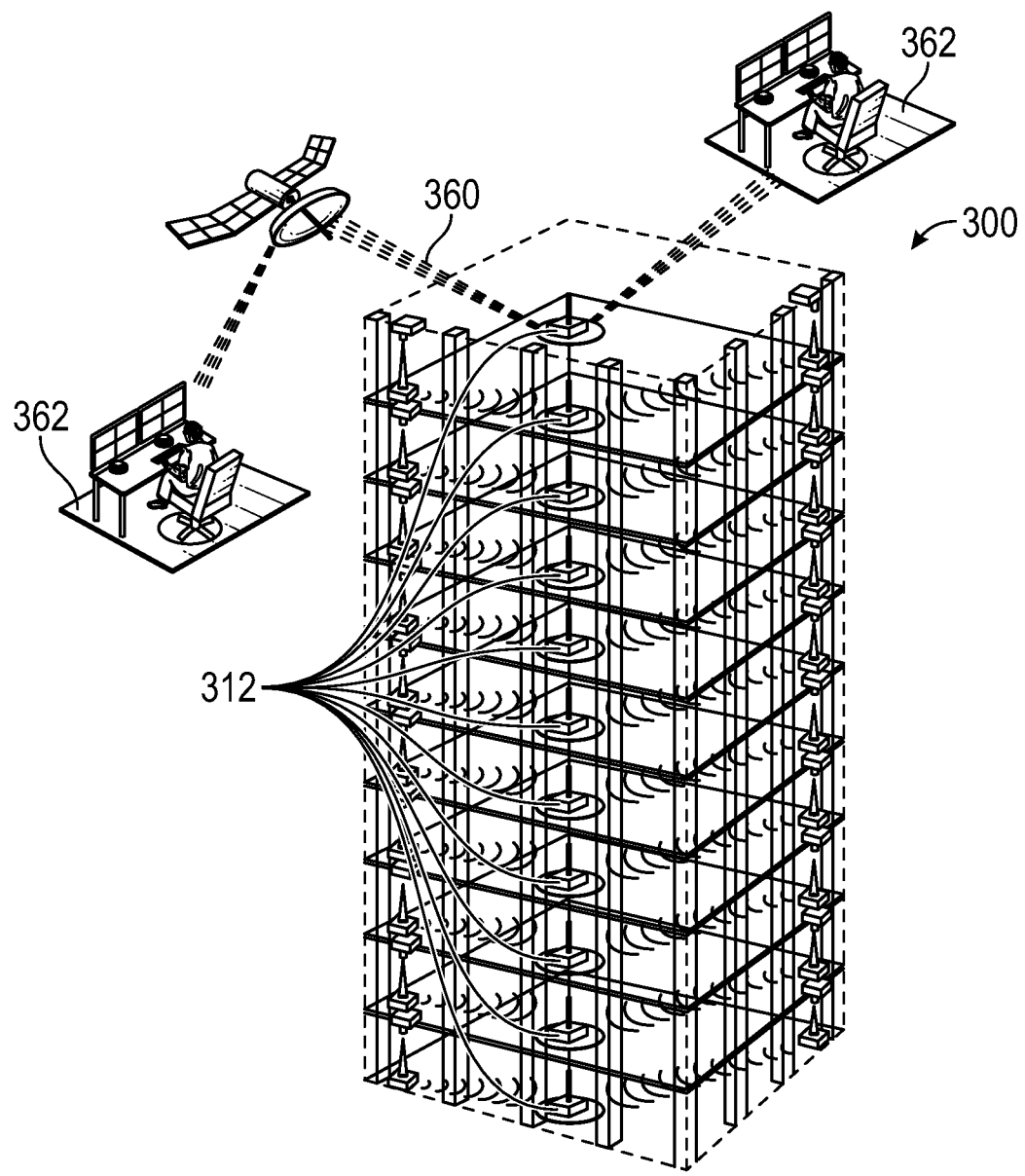
FIG. 13 illustrates an exemplary wireless sensor system for measuring interstory drift.

FIG. 13 illustrates a building monitoring network design based on a plurality of sensor systems 312 and a wireless communication network formed thereby. The network can communicate with various remote devices, such as a remote computing systems 362. In addition, in some embodiments, a satellite uplink 360 can provide backup data distribution in the event of a post-earthquake degraded communication environment.

The systems and methods disclosed herein provide the ability to directly measure structural displacements reliably and economically for effective, real-time Structural Health Monitoring (SHM). These systems are capable of providing immediate, reliable information for post-earthquake decisions and actions giving facility owners and stakeholders new, crucial data for informed decision making and actions.

Figure 14:
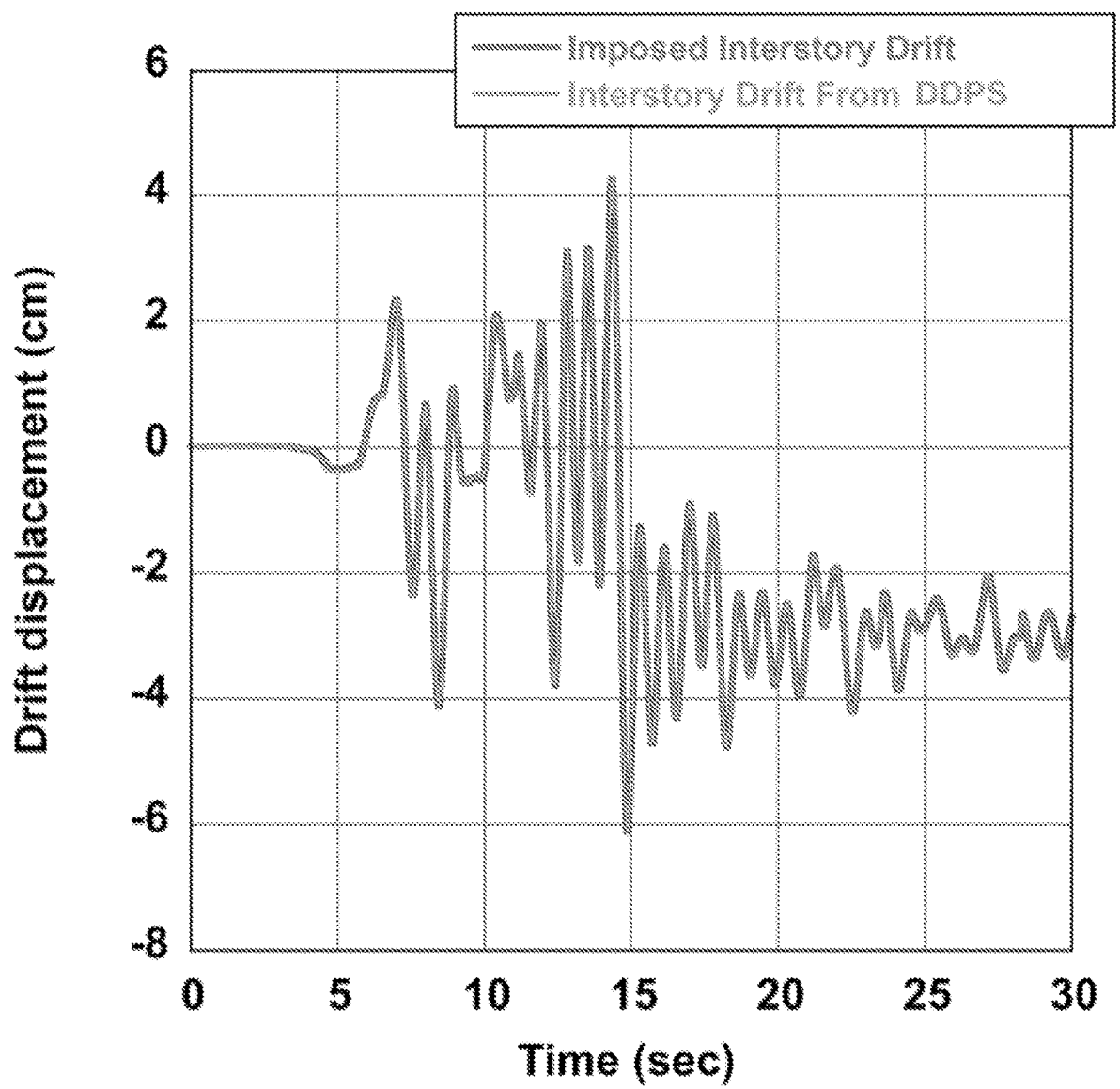
FIG. 14 is a table showing the high degree of accuracy achieved using the sensor system disclosed herein.

The systems and methods disclosed herein are capable of providing very accurate drift displacement measurements. For example, FIG. 14 is a table comparing an amount of imposed interstory drift with the measured drift displacement using the disclosed sensor system. As indicated in FIG. 14, measured amount of drift displacement is very close to the amount imposed drift displacement with an error amount below 0.5 mm.

In some embodiments, the incorporation of wireless communication nodes can allow the sensors to form a self-configuring, self-healing mesh network for data transmission from sensor to sensor and to ultimately to send sensor data in near real time to a specified location. This allows the reliable and rapid transmission of sensor data. This also has important cost and practical implementation implications in that the sensors have a dedicated wireless communication system and do not require cables to be placed for each sensor location to communicate information, which is often one of the most challenging deployment requirements.

In some embodiments, a DDPS monitoring system control system can include event detection based on a selectable event trigger with subsequent data collection and organized data storage accounting for multiple events (e.g. an earthquake with multiple aftershocks). The system can also send emailed sensor status messages to allow insight into the operational status and health of the monitoring system and will allow setting changes to the sensor system (e.g. changing sensor trigger levels) through wireless internet connectivity. The system can also collect sensor data in the event of a triggered event, and subsequently automatically generate and send an email containing key response data and data plots for delivery to selected stakeholders.

The sensor systems disclosed herein are illustrated as mounted to a floor and/or ceiling of consecutive stories of a building. It should be understood that such devices can be mounted in any desired manner, including directly to a surface and/or recessed in a surface. In addition, in some embodiments mounting systems could permit mounting of the devices to one or more walls of the structure, so long as the basic teachings and operations disclosed herein are not compromised.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An interstory drift measurement system comprising:
    a laser beam source configured to emit a beam having a first beam width in a first direction and a second beam width in a second direction, the second direction being perpendicular to the first direction; and
    a sensor system configured to obtain a drift measurement in the first direction, the sensor system comprising a plurality of diodes arranged in at least two rows with at least four diodes in each of the at least two rows,
    wherein the diodes in each row are spaced apart from one another in the first direction, the plurality of diodes including a first diode and having a diode spacing width in the first direction as measured between a centerline of the first diode and a centerline of an adjacent diode of the plurality of diodes in the first direction, and
    wherein the first beam width is at least two times the diode spacing width.

2. The interstory drift measurement system of claim 1, wherein the first beam width is two to fifteen times greater than the diode spacing width.

3. The interstory drift measurement system of claim 1, wherein the first beam width is two to ten times greater than the diode spacing width.

4. The interstory drift measurement system of claim 1, wherein the first beam width is three to eight times greater than the diode spacing width.

5. The interstory drift measurement system of claim 1, wherein the laser beam source is secured to a first surface of a first floor of a building and the sensor system is secured to a facing surface of a second floor of the building,
wherein the laser beam source and sensor system are positioned so that the beam impinges on at least some of the plurality of diodes of the sensor system.

6. The interstory drift measurement system of claim 5, wherein the first floor is above the second floor.

7. The interstory drift measurement system of claim 1, further comprising a processor configured to:
receive a plurality of measured electrical responses from the plurality of diodes, the plurality of measured electrical responses being provided when the beam impinges on respective ones of the plurality of diodes; and
calculate a centroid of the beam based on the measured electrical responses from the plurality of diodes.

8. The interstory drift measurement system of claim 7, wherein the measured electrical responses received by the processor are voltages.

9. The interstory drift measurement system of claim 7, wherein the measured electrical responses received by the processor are induced currents.

10. The interstory drift measurement system of claim 1, wherein the at least two rows of diodes comprise four to twenty rows of diodes.

11. The interstory drift measurement system of claim 1, wherein the at least two rows of diodes comprise six to fifteen rows of diodes.

12. The interstory drift measurement system of claim 1, wherein the at least two rows of diodes comprise six to ten rows of diodes.

13. The interstory drift measurement system of claim 1, wherein at least some of the diodes in the at least two rows are in a staggered arrangement.

14. The interstory drift measurement system of claim 1, wherein the laser beam source is configured to measure biaxial displacement,
wherein the plurality of diodes include diodes spaced apart from one another in the second direction to obtain a second drift measurement in the second direction, the plurality of diodes including a second diode and having a diode spacing width in the second direction as measured between a centerline of the second diode and a centerline of an adjacent diode in the second direction of the plurality of diodes, and
wherein the second beam width is at least two times the diode spacing width in the second direction.

15. The interstory drift measurement system of claim 14, wherein the second beam width is two to fifteen times greater than the diode spacing width in the second direction.

16. The interstory drift measurement system of claim 14, wherein the second beam width is two to ten times greater than the diode spacing width in the second direction.

17. The interstory drift measurement system of claim 14, wherein the second beam width is three to eight times greater than the diode spacing width in the second direction.

18. The interstory drift measurement system of claim 1 wherein the sensor system further comprises a sensor cover with a plurality of openings, wherein the plurality of diodes are aligned with respective ones of the plurality of openings and recessed relative to the sensor cover.

19. The interstory drift measurement system of claim 1, further comprising a wireless communication device operatively coupled to the sensor system to receive measurement information and transmit it to a remote location.

20. The interstory drift measurement system of claim 1, further comprising a control system configured to identify an occurrence of a predetermined event trigger and instruct a collection of data from the sensor system when the occurrence is identified,
wherein the control system is configured to automatically generate and send event information based on the collected data to one or more predetermined remote locations; and
wherein the control system is configured to deliver one or more sensor status messages upon request and/or at predetermined intervals, the one or more sensor status messages including information about an operational status and health of the sensor system.

21. The interstory drift measurement system of claim 1, wherein the at least two rows have a row spacing that is defined by a distance between a first row of the at least two rows and a last row of the at least two rows, and wherein the second beam width is greater than the row spacing.

* * * * *